United States Patent [19]

Yamaguchi et al.

[11] Patent Number: 4,671,890

[45] Date of Patent: Jun. 9, 1987

[54] AMINOBENZYLAMINE COMPOSITION

[75] Inventors: Keizaburo Yamaguchi, Kawasaki; Kenichi Sugimoto; Yoshimitsu Tanabe, both of Yokohama; Midori Yamazaki, Hiratsuka; Akihiro Yamaguchi, Kamakura, all of Japan

[73] Assignee: Mitsui Toatsu Chemicals, Inc., Tokyo, Japan

[21] Appl. No.: 745,066

[22] Filed: Jun. 17, 1985

[51] Int. Cl.$^4$ ............................ C09K 3/00; C08K 5/18; C07C 87/28
[52] U.S. Cl. ...................................... 252/182; 252/77; 564/384; 564/385
[58] Field of Search ................. 564/384, 385; 252/182, 252/77

[56] References Cited

U.S. PATENT DOCUMENTS

| | | | |
|---|---|---|---|
| 3,317,468 | 5/1967 | Griffith | 260/47 |
| 3,794,540 | 2/1974 | Griffith | 156/169 |
| 3,832,401 | 8/1974 | Knifton et al. | 564/385 |
| 4,120,913 | 10/1978 | Petrie | 525/482 |
| 4,179,550 | 12/1979 | Miyamoto et al. | 526/212 |

FOREIGN PATENT DOCUMENTS

| | | | |
|---|---|---|---|
| 821404 | 10/1959 | United Kingdom | 564/385 |
| 2148281 | 5/1985 | United Kingdom | 564/385 |

*Primary Examiner*—Edward A. Miller
*Attorney, Agent, or Firm*—Fisher, Christen & Sabol

[57] ABSTRACT

A composition of aminobenzylamine is provided which is mainly composed of m-aminobenzylamine and p-aminobenzylamine in either the presence or absence of a small quantity of o-aminobenzylamine, is liquid at room temperature, and is an excellent cold-setting type curing agent useful for thermosetting resin compositions.

2 Claims, No Drawings

AMINOBENZYLAMINE COMPOSITION

BACKGROUND OF THE INVENTION

The present invention relates to an aminobenzylamine composition which is liquid at room temperature.

More particularly, the present invention relates to an aminobenzylamine composition which is mainly composed of m-aminobenzylamine and p-aminobenzylamine and is liquid at room temperature, and which is an excellent cold-setting type curing agent useful for thermosetting resin compositions.

Aminobenzylamine is an important compound used as a raw material for heat resistant resins and as a curing agent for epoxy resins. Cold-setting type curing agents are widely used for coating, bonding and casting epoxy resin compositions. Conventional cold-setting type epoxy resin compositions are restricted in use because of their strong smell, undercuring which results from absorption of atmospheric carbon dioxide in the curing process, or inferior heat resistance of the final cured products.

For solving these problems, countermeasures which include the use of larger molecular weight compounds or aromatic amino compounds as the curing agent, have been proposed and practically applied. For example, m-aminobenzylamine is used as a curing agent for epoxy resins. The resulting cured products of these epoxy resins are known to exhibit extremely excellent heat resisting properties and adhesive properties (N R L Report No. 6,439; U.S. Pat. No. 3,317,468; and U.S. Pat. No. 3,794,540).

The compound, m-aminobenzylamine, has a melting point of about 40° C. and is solid at room temperature. When the compound is applied as the curing agent for epoxy resin with a purpose as described above, the compound is poorly miscible with other components in the epoxy resin composition and as a result is insufficiently mixed with those components. As a result, the reaction with epoxy resin does not proceed uniformly and quickly. The cured product does not exhibit good adhesion of bonding, adhesion of coating, or physical strength.

For over coming these drawbacks, organic solvents have been used, but safety problems occur from evaporation of the solvents in the curing stage. Also, bubbles formed in the resin by the evaporating organic solvents reduce the bonding power, adhesion of coating, and physical strength of the cured product.

A method of employing modified m-aminobenzylamine for a liquid adduct has also been tested and satisfactory results have not yet been obtained because of, for example, reduction in the adhesive property.

SUMMARY OF THE INVENTION

It is a primary object of the present invention to provide an aminobenzylamine composition which has the characteristics of the m-aminobenzylamine curing agent for epoxy resin, is useful as a cold-setting epoxy resin curing agent, and is liquid at room temperature.

DESCRIPTION OF THE PREFERRED EMBODIMENTS

The inventors of the present invention have earnestly examined the method for achieving the above mentioned object. As a result, m-aminobenzylamine which is solid at room temperature and has an excellent performance as an epoxy resin curing agent, was mixed with p-aminobenzylamine which is unknown to exhibit properties as an epoxy resin curing agent and is liquid at room temperature. Unexpectedly, the mixture of both compounds is liquid at room temperature. Moreover, the reactivity of m-aminobenzylamine on the epoxy resin curing agent is scarcely reduced and in some blending ratios superior to the use of only m-aminobenzylamine. That is, a mixture of m-aminobenzylamine with p-aminobenzylamine is found to be a liquid at room temperature and a useful composition for the epoxy resin curing agent.

The present invention is an aminobenzylamine composition which comprises 10–70% by weight of m-aminobenzylamine and 30–90% by weight of p-aminobenzylamine and which is liquid at room temperature. This invention includes another aminobenzylamine composition which comprises at least 95% by weight of the above composition. This composition is an aminobenzylamine mixture which is liquid at room temperature comprising 10–70% by weight of m-aminobenzylamine, 30–90% by weight of p-aminobenzylamine, and up to 5% by weight of o-aminobenzylamine. With respect to the composition of the present invention, production processes of o-, m-, and p-aminobenzylamine are not limiting on the invention. The following processes, for example, can be applied.

(A) m-Aminobenzylamine is produced by reducing m-nitrobenzaldoxime on a Raney nickel catalyst, aldoxime, which is derived from m-nitrobenzaldehyde (J. R. Griffith et al, N R L Report 6439).

(B) p-Aminobenzylamine is produced from p-aminobenzonitrile by reducing with aluminium lithium hydride (N. C. Browm et al. J. Medicinal Chem., 20, 1189(1977)).

(C) o-Aminobenzylamine is produced from o-nitrobenzylamine by reducing with red phosphorus and hydroiodic acid (S. Gabriel et al,
Ber., 37,3643–3645(1904)).

The composition of the present invention is an aminobenzylamine composition (composition A) obtained by mixing 10–70% by weight of m-aminobenzylamine with 30–90% by weight of p-aminobenzylamine. Preferably the composition is obtained by mixing 20–60% by weight of m-aminobenzylamine with 40–80% by weight of p-aminobenzylamine. Another aminobenzylamine composition is obtained which comprises of not less than 95% by weight of composition A and not more than 5% by weight of o-aminobenzylamine. Therefore, the composition of the present invention can be prepared by mixing separately o-, m-, and p-aminobenzylamine in an above described proportions.

In addition, aminobenzylamine can be produced in form of a mixture. Upon nitrating benzylamine, nitrobenzylamine is generated as a mixture of o-, m-, and p-isomers. The reaction mixture is poured into water and the precipitate which substantially consisted of m- and p-isomer is separated. The isolated mixture of isomers is catalytically reduced to obtain the aminobenzylamine mixture which mainly comprises m-aminobenzylamine and p-aminobenzylamine. Therefore, the aminobenzylamine mixture thus obtained is used as it is, or by adding a proper amount of separately produced m-, p-, or o-aminobenzylamine to prepare said aminobenzylamine composition having the above described range of components.

The aminobenzylamine composition thus obtained is a stable liquid at room temperature, that is, in the temperature range of about 0° C. to 35° C. or more usually 10°-30° C. The liquid composition in the present invention can be kept in a liquid state for a long period by allowing it to stand at room temperature. For example, the composition can be maintained in the liquid state during storage at about 20° C. for 7 days with entirely no solidification occurring.

The effect of the composition of the present invention on the curing of epoxy resin is not reduced in the presence of p-aminobenzylamine, but exceeds the cooperative effect of m-aminobenzylamine and p-aminobenzylamine. Moreover, the composition can be effectively applied to cold-setting type epoxy resin compositions because it is liquid at room temperature.

When the proportion of components is outside of the above described range, for example, p-aminobenzylamine is increased, the composition is liquid at room temperature and yet the resulting cured product has a low thermal stability and can not maintain its excellent heat resisting property for a long period of time. When the composition of the present invention contains not more than 5% by weight of o-aminobenzylamine, the composition is liquid at room temperature and maintains the performance of the curing agent. An increase of o-aminobenzylamine proportion is, however, not good because of a reduction in the curing agent's performance. When the proportion of m-aminobenzylamine exceeds the above described range, the composition is not desirable, because it sometimes solidifies during storage or in operation although immediate solidification is not found.

The epoxy resins which can use the aminobenzylamine composition of the present invention as the curing agent include amino epoxy resin, phenolic epoxy resin, alcoholic epoxy resin, unsaturated epoxy resin, glycidylester epoxy resin, urethane epoxy resin and other epoxy resins. The composition has a good curing performance for any kind of epoxy resin.

The composition of the present invention is a mixture of m-aminobenzylamine, which is excellent in the performance as an epoxy resin curing agent and yet restricted in this application because it is solid at room temperature, with p-aminobenzylamine which is liquid at room temperature. This invention also can include mixture wherein a small quantity of o-aminobenzylamine is added. In either embodiment the composition is liquid at room temperature and excellent in its performance as an epoxy resin curing agent. Therefore, when the aminobenzylamine composition of the present invention is used for curing epoxy resins, cold-setting can be carried out and the following problems are eliminated. The eliminated problems include the smell of xylylenediamine which is frequently used in conventional curing agents, cold-setting type epoxy resin curing, toxicity, and undercuring due to carbonate formed by the absorption of atmospheric carbon dioxide. The invented composition exhibits a good setting performance, a high curing rate, and a good workability for a variety of epoxy resins. The cured products show very low thermal deterioration and are excellent in high-temperature resistance and thermal stability.

The Present invention is further illustrated in detail in the following Examples, Synthesis Examples, and Comparative Examples in which "%" and "parts" represent "% by weight" and "parts by weight," respectively.

SYNTHESIS EXAMPLE 1

In 100 ml of methanol, 52.9 grams (0.35 mole) of p-nitrobenzaldehyde is dissolved and a solution containing 27.8 grams (0.38 mole) of hydroxylamine hydrochloride and 35 ml of water was dropped at 30° C. over a period of 30 minutes. The reaction mixture was stirred for 2 hours at the same temperature and diluted with 300 ml of water.

The separated crystals were filtered and dried to obtain 55 grams (94.7% yield) of p-nitrobenzaldoxime.

An autoclave was then charged with the p-nitrobenzaldoxime obtained above, 5 grams of Raney nickel catalyst, and 500 ml of methanol. Reducing reaction was continued with a vigorous stirring at 25°-30° C., under hydrogen pressure of 30-50 Kg/cm$^2$G for 3 hours. After the end of the reaction, the resultant mixture was filtered to remove the catalyst and distilled to obtain 18.9 grams of a light yellow oily fraction having a boiling point of 129.5°-130° C./5-6 mmHg. The p-Aminobenzylamine, thus obtained, is in the total yield of 44.2%.

SYNTRESIS EXAMPLE 2

The same procedure as described in Synthesis Example 1 was repeated for this Example except m-nitrobenzaldehyde was used as the raw material to obtain 19.1 grams of m-aminobenzylamine having a melting point of 40°-43° C. in a yield of 44.7%.

EXAMPLE 1

The p-aminobenzylamine and m-aminobenzylamine which are obtained in Synthesis Example 1 and 2, respectively, were blended and stored at a constant temperature for 7 days.

The results obtained are illustrated in Table 1.

TABLE 1

| No. | Composition (% by weight) | | Result after storage (7 days) | | | |
|---|---|---|---|---|---|---|
| | p-Amino-benzylamine | m-Amino-benzylamine | 0° C. | 10° C. | 20° C. | 30° C. |
| 1 | 100 | 0 | L | — | — | — |
| 2 | 75 | 25 | L | — | — | — |
| 3 | 60 | 40 | L | — | — | — |
| 4 | 50 | 50 | S | L | — | — |
| 5 | 40 | 60 | S | L | L | — |
| 6 | 25 | 75 | — | S | L | — |
| 7 | 0 | 100 | — | — | — | S |

Note:
L indicates liquid.
S indicates solid.

As shown in Table 1, the composition of the present invention can remain liquid after storage at room temperature for 7 days.

SYNTHESIS EXAMPLE 3

At a temperature of not higher than 0° C., 107 grams (1 mole) of benzylamine was dropped into 643 grams (10 moles) of 98% nitric acid over a period of 5 hours. After dropping was completed, the reaction was continued at 20°-25° C. for 3 hours with stirring. The resultant reaction mixture was poured into 750 grams of ice water to filter separated crystals, which were washed with an aqueous sodium chloride solution to obtain 254 grams of wet nitrobenzylamine nitrate crystals having a solid content of 61%.

A reduction vessel was then charged with the nitrobenzylamine nitrate obtained above, 1.4 grams of 5% Pd/C catalyst, and 360 ml of water. The reducing reaction was continued with hydrogen introduction at 25°–30° C. for 7 hours. After the end of the reaction, the charge was warmed to 50° C. and filtered to remove the catalyst. The filtrate was neutralized by adding 32 grams of granular sodium hydroxide and allowed to stand for separating into two layers. The lower layer was removed and the upper layer was distilled to obtain 79.4 grams (65% total yield) of a colorless transparent oily fraction having a boiling point of 130°–140° C./5–7 mmHg. The product was a mixture of aminobenzylamine and, according to gas chromatography, it consisted of 41.3% of m-aminobenzylamine, 57.6% of p-aminobenzylamine, and 1.1% of o-aminobenzylamine. The product remained liquid after storage at 5° C. for 7 days.

SYNTHESIS EXAMPLE 4

At a temperature of not higher than 0° C., 107 grams (1 mole) of benzylamine was dropped into a mixed acid containing 77 grams (1.2 moles) of 98% nitric acid and 300 grams (3 moles) of 98% sulfuric acid. The nitrated mixture was treated as described in Synthesis Example 3 to obtain 218 grams of wet crystals of nitrobenzylamine sulfate.

The wet crystals were reduced and treated by the same procedure as described in Synthesis Example 3 to obtain 70.8 grams (58.0% total yield) of a colorless transparent aminobenzylamine mixture. According to gas chromatography, the mixture consisted of 48.5% of m-aminobenzylamine, 50.2% of p-aminobenzylamine, and 1.3% of o-aminobenzylamine. The mixture remained liquid after storage at 5° C. for 7 days.

SYNTHESIS EXAMPLE 5

Benzylamine was nitrated by the same procedure as described in Synthesis Example 4 except that 121 grams (1 mole) of potassium nitrate were used in place of nitric acid and 400 ml of 1,2-dichloroethane were employed.

A colorless transparent oily composition was obtained which consisted of 59.7% m-aminobenzylamine, 36.0% of p-aminobenzylamine and 4.5% of o-aminobenzylamine. The composition remained liquid after storage at 5° C. for 7 days.

EXAMPLES 2–6, COMPARATIVE EXAMPLES 1 AND 2 one hundred parts of amino epoxy resin (Trade Name; EPOTOTO YH-434 Manufactured by Toto Kasei Co.) prepared from diaminodiphenylmethane and epichlorohydrin, and 25 parts of aminobenzylamine obtained in Example 1 and Synthesis Examples 1–5 were mixed and curing time (tack free time) was determined at room temperature. The cured products were allowed to stand for a week and glass transition temperatures were determined by a dynamic viscoelasticity test.

The heat decomposition of cured products were also measured by DTA-Tg (air) method.

The results are illustrated in Table 2.

TABLE 2

| | | | | | Result | |
|---|---|---|---|---|---|---|
| Composition of Aminobenzylamine (%) | | | Curing Time | Glass Transition Temperature (°C.) | Heat Decomposition (%) |
| No. | m- | p- | o- | (min) | | |
| E2 | 59.5 | 36.0 | 4.5 | 150 | 193 | 3.7 |
| E3 | 50 | 50 | — | 126 | 204 | 3.8 |
| E4 | 48.5 | 50.2 | 1.3 | 138 | 197 | 3.8 |
| E5 | 41.3 | 57.6 | 1.1 | 135 | 202 | 3.8 |
| E6 | 25 | 75 | — | 136 | 198 | 4.9 |
| C1 | 100 | — | — | 180 | 185 | 4.9 |
| C2 | — | 100 | — | 140 | 198 | 5.3 |

Note:
(1) Numbers E2–E6 indicate Example 2–Example 6. Numbers C1–C2 indicate Comparative Examples 1 and 2.
(2) Heat decomposition is indicated in % by weight decrease, when samples are heated from room temperature to 300° C. at the rate of 10° C./min.

As shown in Table 2, the compositions of the present invention have a short curing time and low heat decomposition as compared with m- or p-aminobenzylamine along.

What we claim is:

1. An aminobenzylamine composition as curing agent for thermosetting resin composition, consisting of: 10–70% by weight of m-aminobenzylamine and 30–90% by weight of p-aminobenzylamine.

2. An aminobenzylamine composition as curing agent for thermosetting resin composition, consisting of:
   (a) not less than 95% by weight of an aminobenzylamine mixture, said aminobenzylamine mixture consisting of 10–70% by weight of m-aminobenzylamine and 30–90% by weight of p-aminobenzylamine; and
   (b) not more than 5% by weight of o-aminobenzylamine.

* * * * *